April 19, 1960   J. S. BARNETT   2,933,008
APPARATUS FOR CONTOUR PLOTTING
Filed Jan. 24, 1955   2 Sheets-Sheet 1
FIG. 1.
FIG. 3.
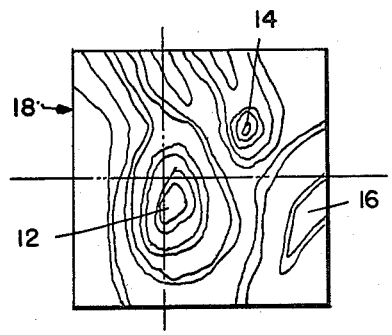
FIG. 4.
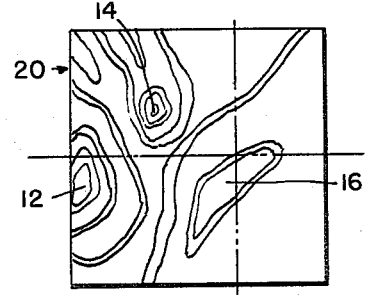
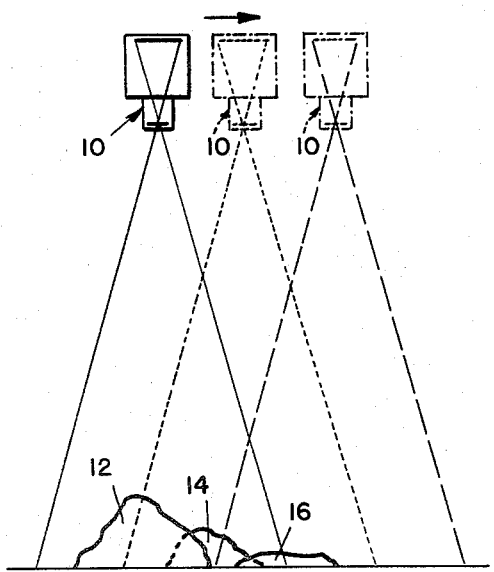
FIG. 2.
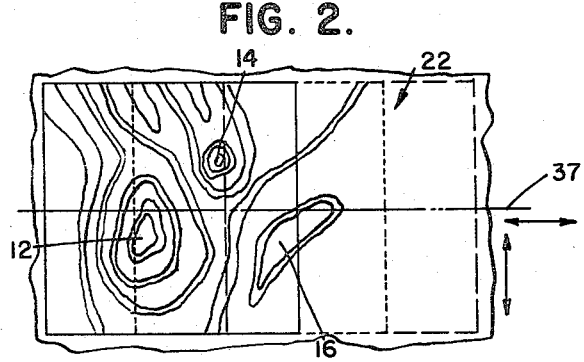
FIG. 5.
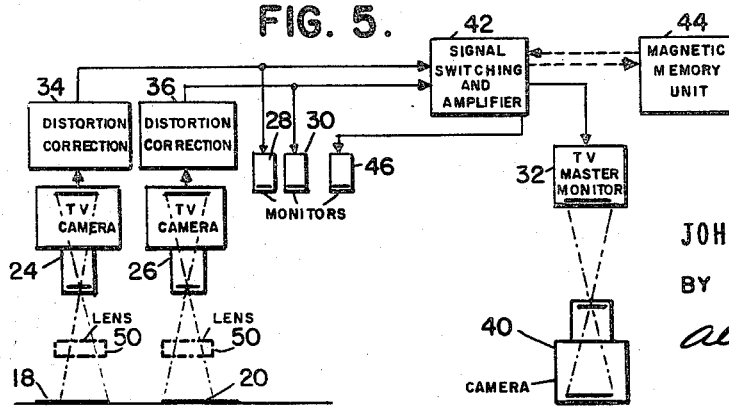
INVENTOR
JOHN S. BARNETT
BY
ATTORNEY April 19, 1960     J. S. BARNETT     2,933,008
APPARATUS FOR CONTOUR PLOTTING
Filed Jan. 24, 1955                                 2 Sheets-Sheet 2
FIG. 6.        FIG. 7.        FIG. 8.
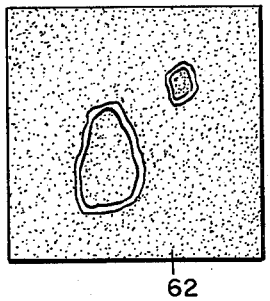
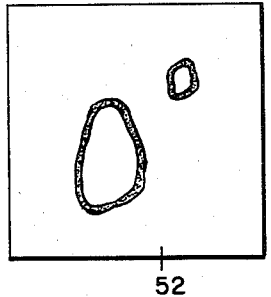
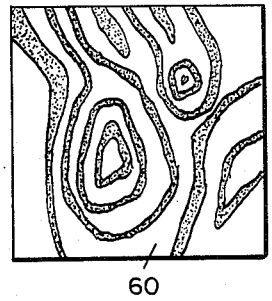
FIG. 9.
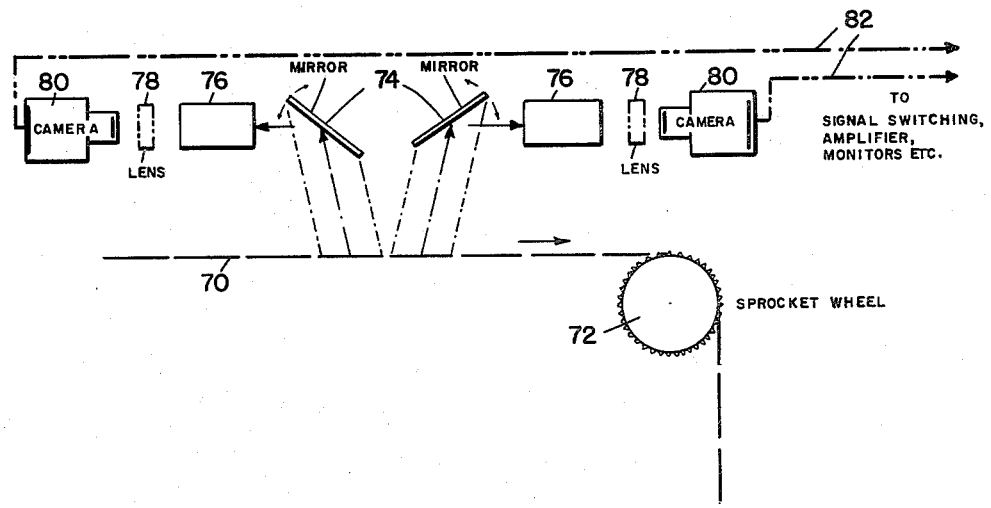
INVENTOR.
JOHN S. BARNETT
BY
ATTORNEY United States Patent Office 2,933,008
Patented Apr. 19, 1960

2,933,008
APPARATUS FOR CONTOUR PLOTTING

John S. Barnett, Los Angeles, Calif., assignor to Photographic Analysis, Inc., North Hollywood, Calif., a corporation of California Application January 24, 1955, Serial No. 483,555

8 Claims. (Cl. 88—14)

This invention relates to topographic maps and has for one of its principal objects the provision of a means for automatically producing typographic maps from aerial stereographic photographs.

One of the important objects of this invention is to provide a simple yet efficient means for producing a map of a desired territory or piece of terrain which will indicate various levels by way of density gradations whereby specific relative elevations of certain points on the map or picture can be readily determined.

A further important object of the invention is to produce a series of images of the area to be mapped and which images, when combined in accordance with the principles of this invention, will automatically indicate the elevation of a selected series of contours.

Other and further important objects of the invention will be apparent from the disclosures in the accompanying drawings and following specification.

The invention, in a preferred form, is illustrated in the drawings and hereinafter more fully described.

In the drawings:

Figure 1 illustrates a camera being moved along over an area to be mapped, as by an airplane or the like.

Figure 2 shows more or less diagrammatically three consecutive overlapping photographs taken by the camera of Figure 1 of the area illustrated in that figure and corresponding to the three positions of the camera shown in Figure 1.

Figure 3 illustrates a negative or photograph of a representative portion of the area to be surveyed or mapped and shows the same as taken by the camera of Figure 1 in its initial position.

Figure 4 illustrates a succeeding photograph taken by the camera when it is in its second position, as shown in Figure 1.

Figure 5 illustrates more or less diagrammatically the means for combining the photographs or negatives taken by the camera in order to produce the desired end result of this invention.

Figure 6 is the intermediate resultant image indicating a contour of the terrain illustrated in Figure 1, produced by the apparatus of Figure 5.

Figure 7 shows a negative rendition of the same image.

Figure 8 illustrates a composite of several contours such as that shown in Figures 6 and 7 and pictures the end result whereby different elevations are immediately discernible.

Figure 9 is a diagrammatic view showing a continuous system for producing topographic maps from the aerial stereographic pictures of the invention.

As shown in the drawings:

The reference numeral 10 indicates generally a camera by means of which the aerial photographs of this invention are taken. The camera is shown in three positions in Figure 1 and each position represents a succeeding film exposure whereby three different pictures are taken, all of which, however, are overlapping.

Also in Figure 1, the reference numerals 12, 14 and 16 indicate areas of different and various elevations such as hills, mountains, valleys or the like, the specific contours at different elevations of which are to be automatically determined by the process and apparatus of this invention.

The image indicated by the reference numeral 18 in Figure 3 represents the first picture taken by the camera 10 when it is in its initial position as shown in Figure 1. The image indicated by the reference numeral 20 in Figure 4 shows the picture taken by the camera when it is in its second position as shown in Figure 1 and the image indicated by the reference numeral 22 in Figure 2 shows a segment of film with successive pictures thereon, all of the same overlapping to some degree as indicated by the dotted and dash lines. The overlapping areas of two succeeding images constitute a stereo for the purpose of the invention. As will be seen, Figure 2 is a somewhat schematic view which illustrates on a composite basis how successive photographs taken from a moving airplane indicate a common portion of the terrain along at least a portion of the photographs.

The two areas of overlap in the images 18 and 20 are presented to a two camera television chain as indicated by the reference numerals 24 and 26 in Figure 5. The images are uniformly illuminated and provision is made for moving one of the images in two dimensions in the plane of the images and for rotating it around an axis perpendicular to this plane.

The two camera signals are controlled and viewed on their separate control monitors 28 and 30 and then mixed together in the master monitor 32, while at the same time, the two superimposed images are viewed simultaneously on the screen of the master monitor 32. Correction may be made for distortion by the electronic elements 34 and 36 respectively, and also by optical elements 50. The camera chain is fed and controlled by one synchronized generator so that all the images are locked together, and provision is made so that either camera output may have its picture polarity reversed from positive to negative. For example, the electronic elements for correcting any distortion may be constructed in a manner similar to that described on pages 241 to 244, inclusive, of "Elements of Television Systems" by George E. Anner (published by Prentiss-Hall, Inc. and first printed in 1951).

For example, if duplicate negative images were presented to the camera chain with the picture polarity positive on both cameras, a double negative image will be presented on the master monitor. Through the use of the image positioning adjustments described above, the two images may be brought into register, resulting in a single high contrast negative image on the monitor. However, if the signal from one of the cameras is reversed to negative and the signal brightness and contrast from both cameras is properly adjusted, a cancellation effect will result which will cause a uniform grey field to be presented on the master monitor 32.

In actual practice, the duplicate negatives are replaced by the two negatives of the stereographic pair 18—20 and the camera signals are adjusted to opposite polarity. The two images presented on the master monitor are then brought into approximate registration by use of the image positioning adjustments hereinabove described.

As registration is approached, areas of equal elevation (at one elevation) will register and will be presented on the master monitor as areas of uniform grey, since the two camera signals will cancel out in these areas. Areas which are at other elevations will not be in register and will be presented as out of register double image areas on the monitor 32. If the adjustable negative is moved along the line indicated by the reference numeral 37 in Figure 2, which is the path of the photographing airplane, by an appropriate increment, all areas at another specific elevation will cancel out in the image presented on the monitor. The movable image can be successively repositioned along the line 37, and at each position, a different cancellation pattern will be presented on the monitor, each representing all areas at a specific elevation.

These images may be photographed by additive exposure on one negative or they may be individually photographed and combined by photomechanical means. A composite contour map may be traced directly from the master monitor 32 and photographs of the images in the master monitor can be taken by a camera 40. The master monitor 32 may be any conventional type of television receiver and may especially include the cathode ray tube used in a telvision receiver. A conventional camera can also be used as the camera 40 under such circumstances. When a conventional camera is used as the camera 40, the pictures of the successive contours can be taken individually and manually without departing from the spirit and scope of the invention. It is also possible to use a motion picture camera as the camera 40 so that pictures are automatically taken of the different contour lines.

In Figure 5, the signal switching and amplifying unit is indicated by the reference numeral 42, a magnetic memory unit by the reference numeral 44 and an additional monitoring device by the reference numeral 46. The magnetic memory unit 44 may constitute a conventional rotary drum in which signals are recorded at successive positions on tracks on the drum in accordance with the amplitude of the signals passing through the amplifier 42 at successive instants of time. As will be appreciated, the amplifier 42 may be constructed in a conventional manner to mix the signals from the cameras 24 and 26 and to amplify the mixed signals. The presentation of successive positions on the memory unit 44 corresponds to the horizontal travel of the flying spots from the cameras 24 and 26 respectively across the pictures 18 and 20. The flying spots travel horizontally across the pictures 18 and 20 and shift downwardly after each scan to initiate a new horizontal scan.

It should be appreciated that the memory unit 44 is included only as an additional stage and does not constitute an essential part of the system. The reason is that the signals from the amplifier 42 may be introduced directly to the monitor 32, as may be seen from the full line extending from the amplifier 42 to the master monitor 32. This full line is in contrast to the broken lines extending between the amplifier 42 and the memory unit 44. The broken lines extending between the amplifier 42 and the memory unit 44 indicate that the signals from the amplifier 42 do not necessarily have to be introduced to the memory unit 44.

The transfer of signals from the amplifier 42 directly to the master monitor 32 or to the memory unit 44 is controlled by the signal switching portion of the amplifier 42. When the information is transferred to the memory unit 44, it is stored for subsequent use. This stored information may be subsequently transferred to the monitor 32 by a proper operation of the signal switching portion of the amplifier 42. The master monitor 32 then operates upon the signals passed by the unit 42 to indicate the contour lines in a visual form.

If the memory unit 44 is not included in the system, the switching portion of the amplifier 42 would also not have to be included. In this way, the signals from the cameras 24 and 26 would be introduced directly to the amplifier portion of the unit 42. The amplifier portion of the unit 42 would then operate on the signals from the cameras 24 and 26 to mix these signals, amplify the mixed signals and then introduce the amplified signals to the master monitor 32. The amplifier portion of the unit 42 may be constructed in a manner similar to that described on pages 347 and 348 of "Elements of Television Systems" by George E. Anner (published by Prentiss-Hall, Inc. of Englewood Cliffs, N.J. and first printed in 1951).

The monitor 46 may also be a conventional television receiver and may especially include the cathode ray tube used in the receiver. The monitor 46 operates in the same manner as the master monitor 32, the purpose of the monitor 46 being to provide a check on the operation of the master monitor 32.

If the image signal polarity of the master monitor 32 is reversed and the signal contrast and brightness are properly adjusted, a condition will be reached where the contour lines appear as dark lines against the white or light mottled field, as best shown at 52 in Figure 7. By recording the signal of each scan, namely a series of images formed at different elevation adjustments, as outlined above, on a magnetic drum individually and successively, and then feeding them back into the master monitor, a composite image, as best shown by the reference numeral 60 in Figure 8, will be presented on the monitor. This composite can be photographed by the camera 40 and the result will be a contour map presenting a number of zones, all parts of each individual zone being at approximately the same elevation.

It will be evident that herein is provided a system and apparatus of plotting topographical areas which will effect an enormous saving of time, since the production of a map from each pair of images such as shown by the reference numeral 62 in Figure 6 would be accomplished almost instantaneously.

A semi-automatic method of presenting the negatives to the camera chain is shown in Figure 9, wherein the images are on a film 70 run over a sprocket 72, the images being reflected by adjustable mirrors 74 into prisms 76, thence through optical distortion correction elements 78 into cameras 80 and finally to the single switching amplifiers, master monitor and the like through lines 82. One purpose of the prisms 76 may be to deflect the image from a plane out of the plane of the paper in Figure 9 into a plane corresponding to the plane of the paper so that images will be directed properly toward the lenses 78. It will be appreciated that the prisms 76 may also be used for other purposes.

It will be seen from the above discussion that the pictorial representations such as the photographs 18 and 20 are stationary during the production of each contour representation. First electrical means including the camera 24 are operative upon the first pictorial representation such as the photograph 18 for sequentially scanning the first pictorial representation at all of the different positions in the first pictorial representation to produce signals in accordance with the light characteristics of the position on the first pictorial representation being scanned at each instant. Second electrical means including the camera 26 are operative upon the second pictorial representation such as the photograph 20 for sequentially scanning the second pictorial representation at all of the different positions in the second pictorial representation to produce signals in accordance with the light characteristics of the position on the second pictorial representation being scanned at each instant.

Means including the amplifier 42 are responsive to the signals from the first and second scanning means for mixing such signals to produce resultant signals having at each instant characteristics dependent upon the characteristics of the signals from the first and second scanning means. Third electrical means including the master monitor 32 are provided for sweeping all of the different positions in a particular area and are responsive to the signals from the mixing means for producing a visual contour in the particular area in accordance with the characteristics of the signals from the mixing means.

When visual indications are to be provided of different contours, means are included for producing adjustments in the sequential scanning of the first pictorial representation by the first scanning means relative to the sequential scanning of the second pictorial representation by the second scanning means. By way of illustration, such adjustments may be obtained by displacing the photograph 18 relative to the photograph 20, such as shown in Figure 2.

I am aware that many changes may be made and numerous details of construction varied throughout a wide range without departing from the principles of this invention, and I therefore do not propose limiting the patent granted hereon otherwise than as recited in the appended claims.

I claim as my invention:

1. In combination for comparing first and second pictorial representations of a first particular area taken from a pair of spaced positions to obtain a contour representation of the first particular area in a second particular area, wherein the pictorial representations are stationary during the production of each contour representation, first electrical means operative upon the first pictorial representation for sequentially scanning the first pictorial representation at all of the different positions in the first pictorial representation to produce signals in accordance with the light intensity of the position on the first pictorial representation being scanned at each instant, second electrical means operative upon the second pictorial representation for sequentially scanning the second pictorial representation at all of the different positions in the second pictorial representation to produce signals in accordance with the light intensity of the position on the second pictorial representation being scanned at each instant, means responsive to the signals from the first and second scanning means for mixing such signals to produce resultant signals having at each instant characteristics dependent upon the characteristics of the signals from the first and second scanning means, third electrical means for sweeping all of the different positions in the second particular area and responsive to the signals from the mixing means for producing a visual contour in the second particular area in accordance wtih the characteristics of the signals from the mixing means, and means for producing adjustments in the sequential scanning of the first pictorial representation by the first scanning means relative to the sequential scanning of the second pictorial representation by the second scanning means to obtain corresponding adjustments in the contour being viewed by the third electrical means in the second particular area.

2. The combination set forth in claim 1 in which the signals introduced to the mixer means from the first electrical means correspond to a negative of the first pictorial representation and in which the signals introduced to the mixer means from the second electrical means correspond to a positive of the second pictorial representation.

3. The combination set forth in claim 1 in which the adjusting means operates to provide a physical displacement of the first pictorial representation relative to the second pictorial representation for each production of a new visual contour by the third electrical means.

4. In combination for comparing a pair of pictorial representations taken of a first particular area from a pair of spaced positions to obtain a contour representation of the first particular area in a second particular area, wherein the visual images are stationary during the production of each contour representation, first scanning means responsive to a first one of the pictorial representations in the pair for sequentially scanning the pictorial representation at all of the different positions on the first pictorial representation to produce signals in accordance with the characteristics of the first pictorial representation at the different positions; second scanning means responsive to the second one of the pictorial representations in the pair for sequentially scanning the second pictorial representation at all of the different positions on the second pictorial representation to produce signals in accordance with the characteristics of the second pictorial representation at the different positions, mixer means responsive to the signals from the first and second scanning means to produce resultant signals representing the composite of the first and second electrical signals; means including third scanning means for sweeping all of the different positions in the second particular area and responsive to the resultant signals from the mixer means for producing a visual image of a contour in accordance with the characteristics of the resultant signals at successive instants of time and wherein the contour is dependent upon the respective positions of the first and second pictorial representations relative to the first and second scanning means, and means for providing adjustments in the position of the first pictorial representation relative to the first scanning means to obtain different contour representations.

5. In combination for comparing a pair of pictorial representations taken of a first particular area from a pair of spaced positions to obtain contour representations of the first particular area in a second particular area wherein the pictorial representations are stationary during the production of each contour representation, first electrical means responsive to the first pictorial representation for sequentially scanning all of the different positions in the first pictorial representation to produce signals dependent upon the characteristics of the light at the position being scanned on the first pictorial representation at that instant, second electrical means responsive to the second pictorial representation for sequentially scanning all of the different positions in the second pictorial representation to produce signals dependent upon the characteristics of the light at the position being scanned on the second pictorial representation at that instant, mixer means responsive to the signals from the first and second electrical means for producing resultant signals dependent upon the combined characteristics of the signals from the first and second electrical means, memory means responsive to the signals from the mixer means for storing the signals from the mixer means and for subsequently reproducing the stored signals, third electrical means for sweeping all of the different positions in the second particular area and responsive to the signals from the mixer means for producing a contour representation in the second particular area in accordance with the signals from the mixer means, and switching means operatively coupled to the mixer means for obtaining an introduction at first particular times of the signals from the mixer means directly to the third electrical means and for obtaining an introduction at second particular times of the signals from the mixer means to the memory means for the subsequent introduction of such signals from the memory means to the third electrical means.

6. In combination for comparing first and second pictorial representations taken of a first particular area from a pair of spaced positions to obtain contour representations in a second particular area of the first particular area wherein the pictorial representations are stationary during the production of each contour representation, first electronic scanning means for sequentially sweeping the first pictorial representation at all of the different positions on the first pictorial representation to produce first signals having characteristics corresponding to the visual presentation at the different positions on the first pictorial representation, second electronic scanning means for sequentially sweeping the second pictorial representation at all of the different positions on the second pictorial representation to produce second signals having characteristics corresponding to the visual presentation at the different positions on the second pictorial representation, means responsive to the signals from the first and second electronic scanning means for mixing the signals to produce resultant signals dependent upon the characteristics of the first and second signals at successive instants of time, and third electronic scanning means for sweeping all of the different positions in the second particular area and responsive to the resultant signals from the mixing means to produce an image representing a contour dependent upon the relative positioning between the first and second pictorial representations.

7. The combination set forth in claim 6 in which the signals introduced to the mixing means from the first electronic scanning means are dependent upon the characteristics of the first pictorial representation and are indicative of a positive and in which the signals introduced to the mixing means from the second electronic scanning means are dependent upon the characteristics of the second pictorial representation and are indicative of a negative.

8. The combination set forth in claim 6 in which first optical means are disposed between the first pictorial representation and the first scanning means and in which second optical means are disposed between the second pictorial representation and the second scanning means and in which means are included to displace the first pictorial representation relative to the first optical means for the production of a new contour by the third scanning means in accordance with such displacement.

References Cited in the file of this patent

UNITED STATES PATENTS

| | | |
|---|---|---|
| 1,396,047 | Nistri | Nov. 8, 1921 |
| 1,699,136 | Eliel | Jan. 15, 1929 |
| 2,251,828 | Hammond | Aug. 5, 1941 |
| 2,283,226 | Porter | May 19, 1942 |
| 2,363,643 | Cook | Nov. 28, 1944 |
| 2,417,446 | Reynolds | Mar. 18, 1947 |
| 2,493,543 | Merchant | Jan. 3, 1950 |
| 2,626,989 | Brown | Jan. 27, 1953 |
| 2,896,501 | Stamps | July 28, 1959 |

FOREIGN PATENTS

| | | |
|---|---|---|
| 537,740 | France | Mar. 8, 1922 |
| 266,044 | Great Britain | Feb. 16, 1927 |